(12) United States Patent
Jean et al.

(10) Patent No.: US 11,994,239 B2
(45) Date of Patent: May 28, 2024

(54) METHOD FOR LAYING AND/OR RECOVERING A LINE IN A BODY OF WATER, COMPRISING A PHASE OF CONTROLLED IMMOBILIZATION, AND ASSOCIATED SYSTEM

(71) Applicant: TECHNIP N-POWER, Courbevoie (FR)

(72) Inventors: Sebastien Jean, Hautot sur Seine (FR); Martin Pierre, Pavilly (FR)

(73) Assignee: TECHNIP N-POWER (FR)

( * ) Notice: Subject to any disclaimer, the term of this patent is extended or adjusted under 35 U.S.C. 154(b) by 0 days.

(21) Appl. No.: 17/622,276

(22) PCT Filed: Jun. 24, 2020

(86) PCT No.: PCT/EP2020/067618
§ 371 (c)(1),
(2) Date: Dec. 23, 2021

(87) PCT Pub. No.: WO2020/260350
PCT Pub. Date: Dec. 30, 2020

(65) Prior Publication Data
US 2022/0243841 A1 Aug. 4, 2022

(30) Foreign Application Priority Data

Jun. 24, 2019 (FR) ..................... 1906804

(51) Int. Cl.
*F16L 1/12* (2006.01)
*F16L 1/15* (2006.01)
(Continued)

(52) U.S. Cl.
CPC ............... *F16L 1/15* (2013.01); *F16L 1/19* (2013.01); *F16L 1/23* (2013.01)

(58) Field of Classification Search
CPC ....... F16L 1/15; F16L 1/19; F16L 1/23; F16L 1/235; F16L 1/205; F16L 1/12; F16L 1/207; B63B 35/03; B63B 35/04
See application file for complete search history.

(56) References Cited

U.S. PATENT DOCUMENTS

| 2011/0033243 A1* | 2/2011 | Roodenburg .......... B65H 59/18 |
| | | 405/168.4 |
| 2011/0123272 A1* | 5/2011 | Pose .................... F16L 1/23 |
| | | 405/166 |

(Continued)

FOREIGN PATENT DOCUMENTS

| EP | 2 005 050 B1 | 6/2010 |
| WO | WO 2007/108673 A1 | 9/2007 |

(Continued)

OTHER PUBLICATIONS

International Search Report dated Sep. 8, 2020 in corresponding PCT International Application No. PCT/EP2020/067618.
(Continued)

*Primary Examiner* — Carib A Oquendo
(74) *Attorney, Agent, or Firm* — OSTROLENK FABER LLP

(57) ABSTRACT

A line laying and/or recovering method in a body of water that includes providing a laying device including two facing upstream grippers and two facing downstream grippers, defining a passage for the circulation of the line; lowering the line to at least one stop position; stopping the line in the at least one stop position; and, prior to the at least one stopping of the line in the stop position, limited downward overrun past the stop position to a change of direction position; time delay in the change of direction position; limited raising of the line from the change of direction position to the stop position.

8 Claims, 5 Drawing Sheets

(51) Int. Cl.
*F16L 1/19* (2006.01)
*F16L 1/23* (2006.01)

(56) References Cited

U.S. PATENT DOCUMENTS

| | | | | |
|---|---|---|---|---|
| 2014/0010595 | A1* | 1/2014 | Maloberti | ............... F16L 1/15 |
| | | | | 405/166 |
| 2014/0169885 | A1* | 6/2014 | Green | ..................... F16L 1/23 |
| | | | | 405/168.4 |
| 2015/0362091 | A1* | 12/2015 | Roodenburg | ........... B63B 35/03 |
| | | | | 405/168.4 |
| 2016/0003374 | A1* | 1/2016 | Roodenburg | ........... B63B 35/03 |
| | | | | 405/168.4 |
| 2017/0248252 | A1* | 8/2017 | Roodenburg | ........... F16L 1/207 |
| 2021/0348454 | A1* | 11/2021 | Charnaux Serta | .... E21B 19/002 |

FOREIGN PATENT DOCUMENTS

| | | |
|---|---|---|
| WO | WO 2011/141793 A1 | 11/2011 |
| WO | WO 2015/069099 A1 | 5/2015 |

OTHER PUBLICATIONS

Written Opinion dated Sep. 8, 2020 in corresponding PCT International Application No. PCT/EP2020/067618.
Search Report dated Jan. 22, 2020 in corresponding French Patent Application No. FR 1906804.

\* cited by examiner

METHOD FOR LAYING AND/OR RECOVERING A LINE IN A BODY OF WATER, COMPRISING A PHASE OF CONTROLLED IMMOBILIZATION, AND ASSOCIATED SYSTEM

CROSS-REFERENCE TO RELATED APPLICATIONS

The present application is a 35 U.S.C. §§ 371 national phase conversion of PCT/EP2020/067618, filed Jun. 24, 2020, which claims priority to French Patent Application No. 1906804, filed Jun. 24, 2019, the contents of which are incorporated herein by reference. The PCT International Application was published in the French language.

BACKGROUND OF THE INVENTION

The present invention relates to a method for laying and/or recovering a line in a body of water, comprising:
providing a laying device comprising at least two upstream gripping members facing each other and at least two downstream gripping members facing each other, the facing gripping members defining a line circulation passage in which the line is locally gripped; each gripping member comprising a line movement member and at least one motor for setting the movement member in motion that can be activated to deliver a line movement torque; the laying device comprising a control unit for each motor, the method comprising the following steps:
lowering the line to at least one stop position;
stopping the line in the or each stop position.

The flexible line is, for instance, a flexible pipe as described in the normative documents published by the American Petroleum Institute (API), API 17J "Specification for Unbonded Flexible Pipe" 4th Edition May 2014, and API RP 17B "Recommended Practice for Flexible Pipe" 5th Edition May 2014. The flexible pipe is for example a riser and/or a flowline.

In one variant, the flexible pipe is a composite bundle, comprising at least one fluid transport tube and a set of electrical or optical cables suitable for transporting electrical or hydraulic power or information between the bottom and the surface of the body of water.

In another variant, the flexible line is a subsea umbilical described in API 17E, or an electrical power cable.

More generally, the line laid or recovered by the method is a rigid pipe as described in the normative document published by Det Norske Veritas and Germanischer Lloyd (DNV-GL), DNVGL-ST-F101 "Submarine pipeline systems" Edition 2017.

To deploy such flexible lines, it is known to unwind them from storage means present on a floating laying system, for example described in EP 2 005 050.

The storage means are in particular a rotating drum or basket.

The line is unwound from the storage means and then generally reassembled on a chute carried by the tower of the laying device.

The line is then engaged in gripping and moving assemblies comprising tracked gripping members. The line runs vertically or at an angle down the tower before plunging into the body of water.

The line is held in place by facing gripping members that ensure its suspension in the body of water. In addition, the facing gripping members support the mechanical tension coming from the weight of the unwound line and prevent the storage means from being subjected to this weight, while ensuring that the line does not undergo bending beyond its minimum bending radius (MBR) to avoid damage.

To lower the line into the water, a vertical pool is usually provided through the ship's hull to form a passage for the line to descend. Such a well is called a "moon pool".

More generally, the tower of the laying device extends vertically or at an angle in the vicinity of this well to allow deployment of the line through the passage. Alternatively, the tower of the laying device is located at the rear of the hull. In most cases, the laying device comprises at least a first group of upper gripping members and a second group of lower gripping members, from top to bottom on the tower.

Alternatively, the line is laid horizontally with gripping members arranged in tandem.

Laying a flexible line in a body of water is not a completely continuous operation. Indeed, it is sometimes necessary to stop the laying of the line to carry out various operations.

This includes, for example, placing buoys around the line at regular intervals to give it a wave-shaped configuration.

Other operations include spot repairs on the line, or underwater operations related to the line, e.g. connections/disconnections, or underwater unmanned vehicle interventions.

Stopping the laying can also be the result of a pause, for example due to the weather and/or constraints imposed by nearby oil installations.

In order to temporarily stop the laying process, the gripping members are equipped with mechanical brake systems that block the shaft of at least one motor on command of the control unit. Then, when the installation can be restarted, the control unit deactivates the mechanical brakes and reactivates the gripping members.

In a method of the above-mentioned type, when the line is stopped after being lowered, the stresses on the gripping members along the line are not constant along the gripping members.

In particular, the lower and upper parts of the gripping members are subjected to a relatively high downward stress immediately after the line has come to a stop, which results from the stabilisation of the line on the gripping member (known as "pad landing" or "pad take off"). This stress prevents the line from being retained by the input device.

When the line is of low mass, or at the start of laying a line of higher mass, this phenomenon has no effect, as the gripping members are designed with a nominal holding capacity well in excess of the hanging weight carried.

However, for a long suspended line, the above phenomenon can be problematic when the hanging weight carried by the gripping members approaches the nominal holding capacity of the gripping members. In this case, the holding capacity of the line may be insufficient, leading in critical cases to an uncontrolled fall of the line into the body of water.

It is therefore necessary to allow for significant safety margins, generally leading to a reduction in the system's laying capacity, particularly in terms of hanging weight.

SUMMARY OF THE INVENTION

It is therefore an aim of the invention to provide a method of laying and/or raising a flexible line which enables a flexible line to be laid safely, without causing a significant reduction in laying capacity.

To this end, the invention has as its object a method of the aforementioned type, performed before the or each stopping of the line in the stop position:
- limited downward overrun past the stop position to a change of direction position;
- time delay in the change of direction position;
- limited raising of the line from the change of direction position to the stop position.

The method according to the invention may comprise one or more of the following features, taken alone or in any combination that is technically possible:
- the limited movement past the stop position is at most 10 m, in particular at most 3 m, in particular at most 1 m;
- the limited movement from the stop position is at least 0.5 m;
- the time delay in the change of direction position is at most 60 s, preferably at most 40 s, in particular at most 10 s;
- the time delay in the change of direction position is at least 0.5 s;
- successively stopping the line in a plurality of successive stopping positions, the method comprising prior to each successive stop, the following steps:
- limited downward overrun past each successive stop position to a successive change of direction position;
- time delay in each successive change of direction position;
- limited raising of the line from each successive change of direction position to the successive stop position;
- the steps of limited downward overrun past the stop position to a change of direction position, delay in the change of direction position, and limited upward raising of the line from the change of direction position to the stop position are implemented when the hanging weight of the line is greater than 50% of the maximum holding capacity of the gripping members;
- it comprises, after the line has been stopped in the or each stop position, the following steps:
- activating the motor of at least one upstream gripping member and/or at least one downstream gripping member by the control unit, in order to apply to the movement member of the upstream gripping member and/or of the downstream gripping members a torque for retaining the line against its weight by the pair of upstream gripping members and/or by the pair of downstream gripping members,
- it comprises the at least occasional control by the control unit of at least one motor of an upstream gripping member and/or of a downstream gripping member in order to produce a movement of a movement member of the upstream gripping members and/or of the downstream gripping members or to change the retaining torque applied to the movement member of the upstream gripping members and/or the downstream gripping members without moving the movement member of the upstream gripping members and/or of the downstream gripping members;
- after the line has been stopped in the or each stop position, the method comprises the installation of a buoy around the line, a spot repair on the line, an underwater operation in relation to the line, in particular a connection/disconnection, or an underwater remotely operated vehicle intervention and/or a postponement of the laying, due to the weather or/and to constraints imposed by a neighbouring facility and,
- it comprises the following steps:
- raising the line to at least one stop position;
- stopping the line in the or each stop position;
- the method comprising, prior to the or each stopping of the line in the stop position:
- limited upward overrun past the stop position to a change of direction position;
- time delay in the change of direction position;
- limited lowering of the line from the change of direction position to the stop position.

The invention also relates to a system for laying and/or recovering a line in a body of water, comprising:
- a laying device comprising a pair of upstream gripping members and a pair of downstream gripping members, each pair of gripping members defining a line circulation passage into which the line is locally gripped;
- each gripping member comprising a member for moving the line and at least one motor for setting the movement member in motion, which can be activated to deliver a movement torque for the line;
- a control unit for each motor, able to carry out:
- lowering the line to at least one stop position
- stopping the line in the or each stop position
- characterised in that the control unit of each motor is adapted to execute, before the or each stop of the line in the stop position:
- a limited downward overrun past the stop position to a change of direction position;
- a time delay in the change of direction position;
- a limited raising of the line from the change of direction position to the stop position.

The system according to the invention may comprise one or more of the following features, taken alone or in any combination that is technically possible:
- the limited movement past the stop position is at most 10 m, in particular at most 3 m, in particular at most 1 m, and
- the time delay in the change of direction position is at most 60 s, preferably at most 40 s, in particular at most 10 s.

DESCRIPTION OF THE DRAWINGS

The invention will be better understood upon reading the following description, given only as an example, and with reference to the attached drawings, in which.

DETAILED DESCRIPTION

Figure 1:
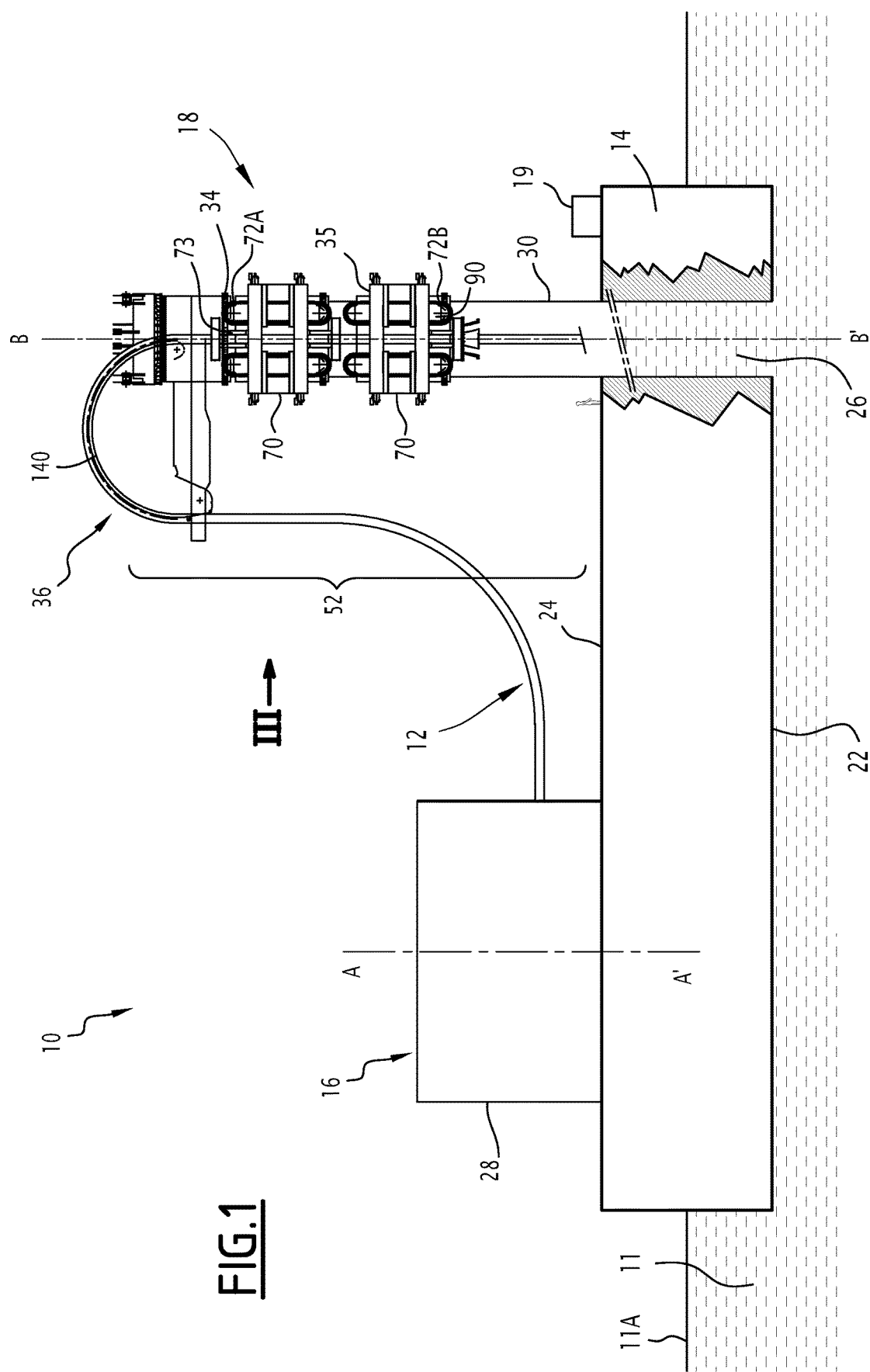
FIG. 1 is a schematic view of a first laying and/or recovery system according to the invention.
Figure 2:
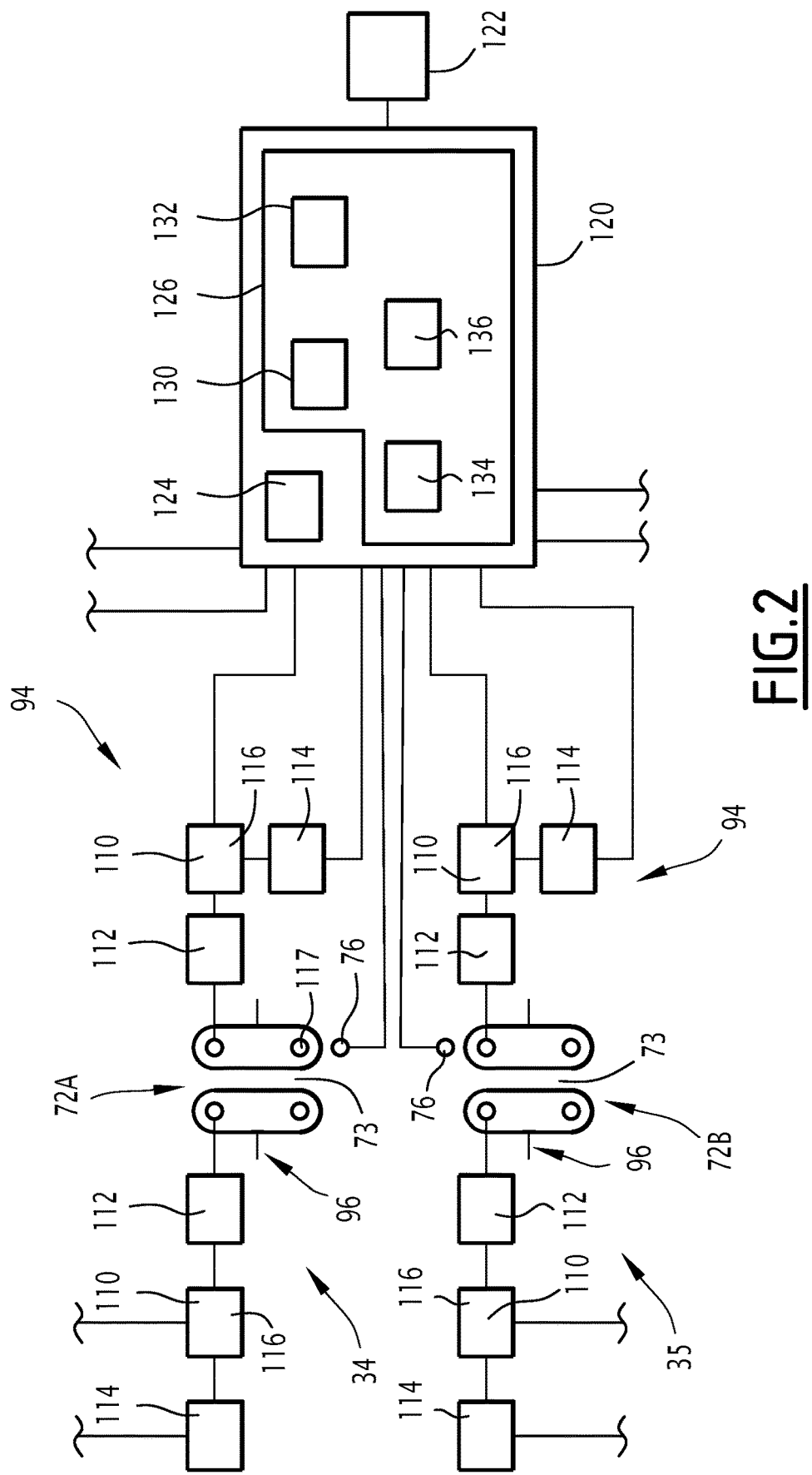
FIG. 2 is a block diagram illustrating the laying device and the control unit of the device in the laying and/or recovery system according to the invention.
Figure 3:
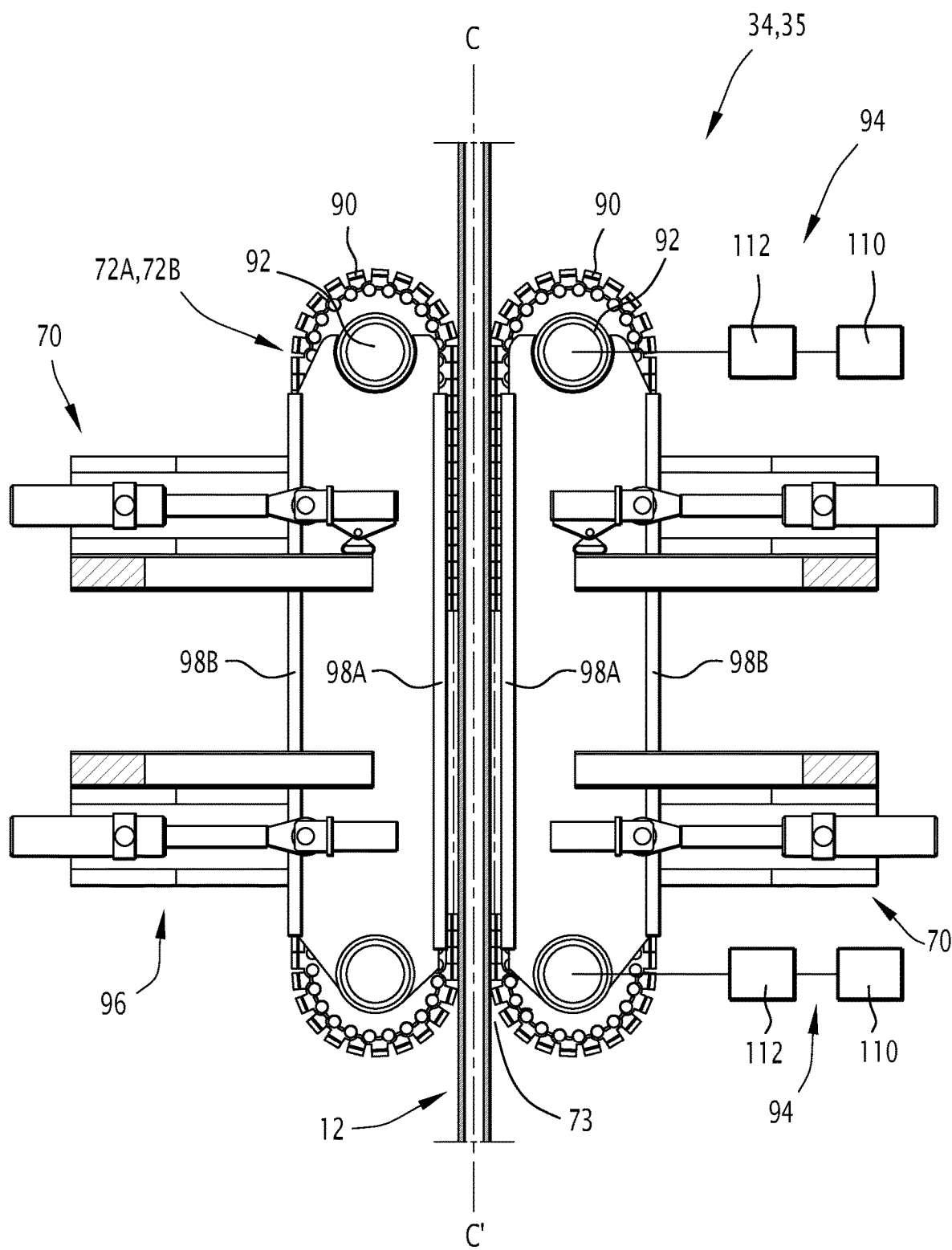
FIG. 3 is a schematic view of a laying device gripping member according to the invention.

A first system 10 for laying and/or recovering a line 12 is shown in FIGS. 1 to 3.

In this example, the system 10 floats on a body of water 11 (visible in FIG. 1) which is for example a sea, ocean or lake. The depth of the body of water 11 between the surface 11A and the bottom is greater than 5 meters, and is in particular between 100 meters and 4,000 meters.

The laying system 10 is intended for laying and/or recovering a flexible line 12 which is advantageously a flexible line, in particular a flexible pipe.

A flexible pipe includes a pipe as described in the normative documents published by the American Petroleum Institute (API), API 17J, and API RP17B. Alternatively, the pipe is an umbilical as described in the normative documents published by the American Petroleum Institute (API), API 17E, or a reeled rigid pipe as described in the normative document published by Det Norske Veritas and Germanischer Lloyd (DNV-GL), DNVGL-ST-F101 Edition 2017.

This definition includes both unbonded and bonded flexible pipes.

More generally, in one variant, the flexible line 12 is a composite bundle, comprising at least one fluid transport tube and a set of electrical or optical cables suitable for transporting electrical or hydraulic power or information between the bottom and surface of the body of water.

In another variant, the flexible line 12 is a subsea umbilical described in API 17E, or an electrical power cable.

Alternatively, line 12 is a rigid pipe as described in DNVGL-ST-F101.

The line 12 may carry equipment, such as buoys, connectors, or bottom equipment that has a greater transverse extent than its average transverse extent.

With reference to FIG. 1, the laying and/or recovery system 10 comprises a hull 14 floating on the body of water 11, and a line 12 storage assembly 16 on the hull 14.

It comprises a laying and/or recovery device 18 and a control unit 19, both mounted on the hull 14.

The hull 14 is, for example, the hull of a vessel comprising propulsion means. In one variant, the hull 14 is formed by a platform floating on the body of water 11, a barge, or a semi-submersible barge.

The hull 14 extends between a lower surface 22 submerged in the body of water 11 and an upper deck 24, from which the laying and/or recovery device 18 projects.

Advantageously, the deck 24 is located above the surface 11A of the body of water 11. In this example, the hull 14 defines internally, between the lower surface 22 and the upper surface 24, a central through-well 26, visible in FIG. 1.

The central shaft 26 extends vertically. It opens upwardly onto the deck 24 and it opens downwardly into the body of water 11 through the lower surface 22.

When the line 12 is a flexible pipe, the storage assembly 16 is formed by a rotatable pipe storage member 28 in a wound configuration. The rotating member 28 is, for example, a drum with a horizontal axis of rotation or a basket with a vertical axis of rotation.

The storage assembly 16 is arranged on the deck 24 or in the hull 14.

The rotation of the storage member 28 in a first direction about its axis A-A' allows an increasing length of line 12 to be unwound to the laying device 18, while rotation in a second direction opposite the first direction allows an increasing length of pipe to be wound onto the storage member 28.

According to the invention, the laying device 18 comprises a tower 30 with a vertical axis B-B', defining a tower axis, at least one upper assembly 34 for gripping and moving the line 12, and at least one lower assembly 35 for gripping and moving the line 12, the assemblies 34, 35 being carried by the tower 30.

The laying device 18 further comprises an assembly 36 for guiding the movement of the line 12 between the storage assembly 16 and the gripping and moving assemblies 34, 35.

Each assembly 34, 35 comprises a support frame 70 and at least two tracked gripping members 72A, 72B, for example between two and six gripping members 72A, 72B, carried by the frame 70.

Each assembly 34, 35 further includes a sensor 76 for the measuring of information representative of the load applied by the line 12 onto the gripping member 72A, 72B (visible in FIG. 2).

Each frame 70 is adapted to be moved between an open configuration for placing the line 12 in the frame and a closed configuration for use.

In the closed configuration, with reference to FIG. 3, each frame 70 defines a central passage 73 extending vertically along an axis C-C' defining a laying axis of the line 12. This laying axis C-C' is substantially parallel to the axis B-B' of the tower 30, i.e. completely parallel or inclined at an angle of less than, for example, 10° to the axis B-B'.

With reference to FIGS. 2 and 3, each frame 70 advantageously carries two gripping members 72A, 72B arranged substantially parallel to each other Each gripping member 72A, 72B projects into the passage 73 towards the C-C' axis.

The gripping member 72A, 72B comprises a movement member 90, formed by a guide track for gripping and moving the line 12, two sprockets 92, on which the movement member 90 is wound, a device 94 for driving the movement member 90 along the axis B-B', and a mechanism 96 for radially moving each movement member 90 towards the axis B-B'.

The movement member 90 is substantially in the form of an endless belt wound on two sprockets 92. It thus has a longitudinal portion 98A for guiding the pipe and a longitudinal return portion 98B, intended to extend parallel to the axis C-C' of laying.

Here, the moving member 90 comprises a plurality of runners mounted end-to-end to form the endless belt.

The guide portion 98A is adapted to contact the outer peripheral surface of the line 12 along a generatrix. In the closed configuration, the opposite guide sections 98A of two facing gripping members 72 face each other and are adapted to respectively grip two opposite angular sections of the line 12 with respect to the axis C-C'.

The sprockets 92 are rotatable about an axis perpendicular to the axis C-C'. They are rotated about their axis by the device 94 to cause the parts 98A, 98B to move parallel to the axis C-C'.

With reference to FIG. 2, each driving device 94 comprises a motor 110, controllable by the control unit 19, advantageously a geared motor 112, connecting the motor 110 to at least one sprocket 92 and a mechanical brake 114 for locking the motor 110.

Advantageously, the driving device 94 comprises a sensor 116 for measuring the torque applied by each motor 110, and/or a sensor 117 for measuring the speed of movement of the line 12.

The motor 110 is for example a hydraulic motor or an electric motor. It is able to generate a variable torque depending on the desired configuration. The variable torque is selected from a torque for retaining the line 12 in an immobile configuration of the line 12, and a torque for moving the line 12 through the central passage 73 in a moving configuration of the line 12.

The mechanical brake 114 is also controllable by the control unit 19 between a disengaged position, in which the motor 110 is free to rotate the sprockets 92, and an engaged position in which it is capable of immobilizing the motor 110 and/or each sprocket 92 to statically retain the line 12, even in the absence of torque applied by the motor 110.

The radial movement mechanism 96 comprises, for example, at least one actuator adapted to radially move each movement member 90 towards the laying axis C-C', in order to apply a determined force on the outer peripheral surface of the line 12.

The control unit 19 is schematically depicted in FIGS. 1 and 2. For example, it includes a computer 120 and a human-machine interface 122.

The computer 120 comprises a processor 124 and a memory 126 suitable for containing functional software modules to be run by the computer 124. In one variant, the functional modules are implemented at least partially as programmable logic components or as dedicated integrated circuits.

In this example, the memory 126 contains a module 130 for selectively activating each motor 110, a module 132 for regulating each the speed or torque of each motor 110, connected to each sensor 116, 117, and advantageously, a module 134 for activating the mechanical brake 114.

It contains a module 136 for controlling the modules 130, 132, 134 between an idle configuration, a configuration for laying and/or recovering the line 12, and a configuration for immobilization of the line 12.

In the idle configuration, the activation module 130 deactivates each motor 110 and the activation module 134 activates at least one mechanical brake 114.

In the laying and/or recovery configuration, the activation module 134 deactivates each mechanical brake 114. The activation module 130 activates each motor 110 and the regulation module 132 controls the torque and/or speed of each motor 110 on the basis of the information received from at least one sensor 116, 117 in order to achieve a laying and/or recovery speed greater than 2 m/hour, in particular between 2 m/hour and 2,000 m/hour.

In the laying configuration, prior to moving into an immobilized configuration of the line 12 in at least one stop position, the control module 136 is adapted to control the regulation module 132 of each motor 110 to effect a limited downward overrun 158 past the stop position, to reach a change of direction position, and then to effect a time delay 160 in the change of direction position, in which the line 12 remains temporarily immobile, before effecting a limited upward raising 162 of the line 12 from the change of direction position to the stop position.

The limited overrun 158 is preferably at least 0.5 m. The limited overrun 158 is advantageously at most 10 m, for example at most 7 m, in particular at most 3 m, in particular at most 1 m. This overrun is generally between 0.5 m and 1 m.

In order to ensure an adequate change of direction of the line 12, the time delay 160 in the change of direction position, in which the line 12 remains stopped, preferably lasts at least 0.5 seconds.

The time delay 160 in the change of direction position advantageously lasts at most 60 seconds, preferably at most 40 seconds, in particular at most 10 seconds and is generally between 1 and 5 seconds.

The limited upward raising of the line 12 from the change of direction position allows the desired stop position for the line 12 to be reached, in which the control module 136 controls the modules 130, 132, 134 in the immobilisation configuration.

Preferably, the control module 136 is adapted to perform the previously described steps 158, 160, 162 for a plurality of successive stops of the line 12 in successive stop positions.

In this case, the method comprises, prior to each successive stop, the steps of limitedly overrunning each successive stop position downwardly to a successive change of direction position, delaying in each successive change of direction position, and limitedly raising the line 12 from each successive change of direction position to the successive stop position.

The steps 158, 160, 162 are preferably implemented for any stopping of the line 12 occurring when the hanging weight of the line 12 under the gripping members 72A, 72B is greater than 50% of the maximum holding capacity of the gripping members 72A, 72B, with a maximum radial clamping setting of the gripping members 72A, 72B facing each other.

These settings are defined by the weight, diameter, and mechanical and structural strength characteristics of the line 12 to be installed.

In the latter case, steps 158, 160, 162 are not implemented for any stopping of line 12 occurring between the start of laying and the moment when the hanging weight reaches 50% of the maximum capacity.

Alternatively, these steps are carried out before each successive stop of the line 12 in a stop position.

Advantageously, in the immobilisation configuration, the method described in the French application FR 18 74403 is implemented.

In this method, the control module 136 controls the modules 132 and 134 to perform a succession of maintaining-immobile intervals of the line 12, in which the motors 110 of at least one upper gripping member 72A and of at least one lower gripping member 72B apply a holding torque to the line 12 without moving a retaining member 90, and load regulation intervals, in which a motor 110 of an upper gripping member 72A or of an upper gripping member 72B is active to generate a limited movement of a retaining member 90 of a lower gripping member 72A and/or an upper gripping member 72B or a change in the holding torque applied to a movement member 90 of a lower gripping member 72A and/or of an upper gripping member 72B.

Preferably, the control module 136 regularly measures information representative of a difference between the load applied to at least one upper gripping member 72A and the load applied to at least one lower gripping member 72B using the sensors 76, and moves a movement member 90 of the lower gripping members 72B and/or the upper gripping members 72A by the motor 110, or changes the torque applied to a movement member 90 of the lower gripping members 72B and/or the upper gripping members 72A by the motor 110 according to the measured representative information.

In particular, if the aforementioned load difference reaches a predetermined threshold, the control module 136 activates the motor 110 of a lower gripping member 72B in order to move a movement member 90 of the lower gripping members 72B or to change the holding torque applied to the movement member 90 of the lower gripping members 72B until the measured load difference is less than or equal to the predetermined threshold.

The human-machine interface 122 comprises, for example, a control member, in particular a joystick and/or a touch screen, and a display to allow the control unit 19 to be switched between the idle configuration, the laying and/or recovery configuration, and the immobilisation configuration of the line 12. It is adapted to allow the user to select a laying and/or recovery speed of the line 12 in the laying and/or recovery configuration.

With reference to FIG. 1, the guide assembly 34 includes at least one curved guide chute 140 or wheel disposed above the tower 30 for redirecting the line 12 taken from the storage assembly 16 in the axis of the tower 30.

The chute 140 is substantially U-shaped and faces downward, defining a suitable bending radius for the line 12. This bending radius is greater than the minimum bending radius (MBR) of the line 12.

A method for laying the line 12, implemented using the system 10, will now be described.

Initially, the line 12 is stored in the storage assembly 16 by being wound on the rotating member 28.

The line 12 thus maintains an adequate radius of curvature greater than its MBR.

The system 10 is then moved across the body of water 11 to a laying region where the line 12 is to be deployed.

The respective frames 70 of the gripping and moving assemblies 34, 35 are at least partially open.

One end of the line 12 is then brought into contact with the chute 140 by engaging it thereon.

Then, a line section 12 is successively deployed over the chute 140 and then lowered through each frame 70 to extend vertically along the C-C' axis.

Next, the 70 frames are moved to their closed position.

The mechanisms 96 for radially moving the movement members 90 are then activated to apply each longitudinal guide portion 98A against the outer peripheral surface of the line 12 along a generatrix thereof.

The radial movement mechanisms 96 are further controlled to apply a predetermined pressure to the line 12.

Figure 4:
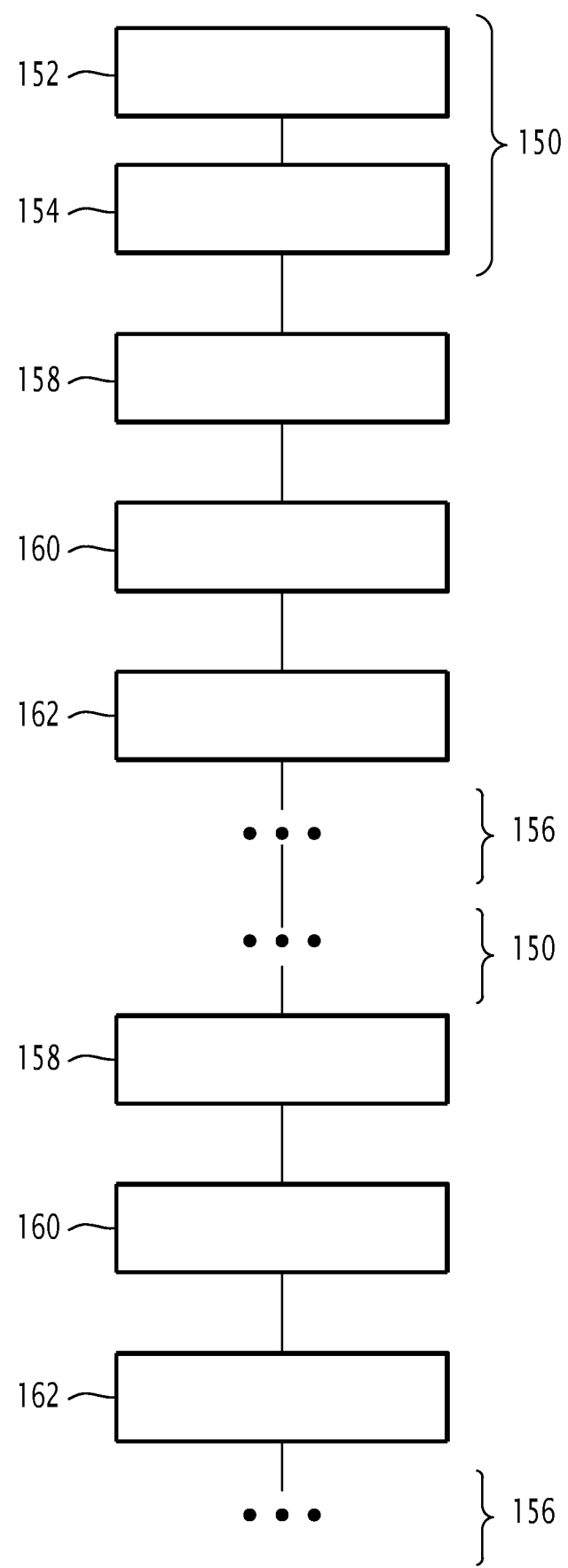
FIG. 4 is a flow chart illustrating the successive steps of a laying method according to the invention.

With reference to FIG. 4, a laying phase 150 is then performed. In this step 150, the control unit 19 switches to its laying configuration. It activates the motors 110 in step 152, and drives the motors in step 154 to develop a movement torque for the movement member 90. This results in a continuous downward movement of line 12 through the circulation passages 73, regulated at a speed of travel greater than 2 m/hour, in particular between 2 m/hour and 2,000 m/hour.

The device 94 for rotating the sprockets 92 is activated. The movement members 90 are driven to move, so that each longitudinal portion 98A moves up and down driving the line 12. The line 12 is thus driven downward in translation along the laying axis C-C' by the movement members 90 of the facing gripping members 72A, 72B of each assembly 34, 35.

An increasing length of line 12 can thus be deployed, with controlled tension, through the gripping and guiding assemblies 34A, 34B.

In the method according to the invention, illustrated by FIG. 4, when the laying has to be interrupted, for example for the installation of a buoy, for a line repair, to perform underwater activities such as a connection, or for a stop, an immobilisation phase 156 in an stop position is then implemented.

In this case, just before the line 12 is immobilised in the stop position, the control module 136 controls the regulation module 132 to effect a limited downward overrun 158 from the stop position to a change of direction position.

As indicated earlier, this limited overrun is preferably at least 0.5 m. The limited overrun 158 is advantageously at most 10 m, for example at most 7 m, in particular at most 3 m, in particular at most 1 m. This overrun is generally between 0.5 m and 1 m.

Next, a time delay 160 is performed in the change of direction position. During this delay, the line 12 temporarily stops in the change of direction position.

In order to ensure an adequate change of direction of the line 12, the time delay 160 in the change of direction position, in which the line 12 remains stopped, preferably lasts at least 0.5 seconds.

The time delay 160 in the change of direction position advantageously lasts at most 60 seconds, preferably at most 40 seconds, in particular at most 10 seconds and is generally between 1 and 5 seconds.

Once the time delay has elapsed, the process involves a limited raising 162 of the line 12 from the change of direction position to the stop position. This raising is done within the above-mentioned overrun distance and the line 12 is then stopped in the stop position.

The operations to be carried out on the line or on the facility can then be implemented.

Subsequently, a new laying phase 150 of line 12 is started, as described above, and of further stops 156 of line 12, as described above.

Figure 5:
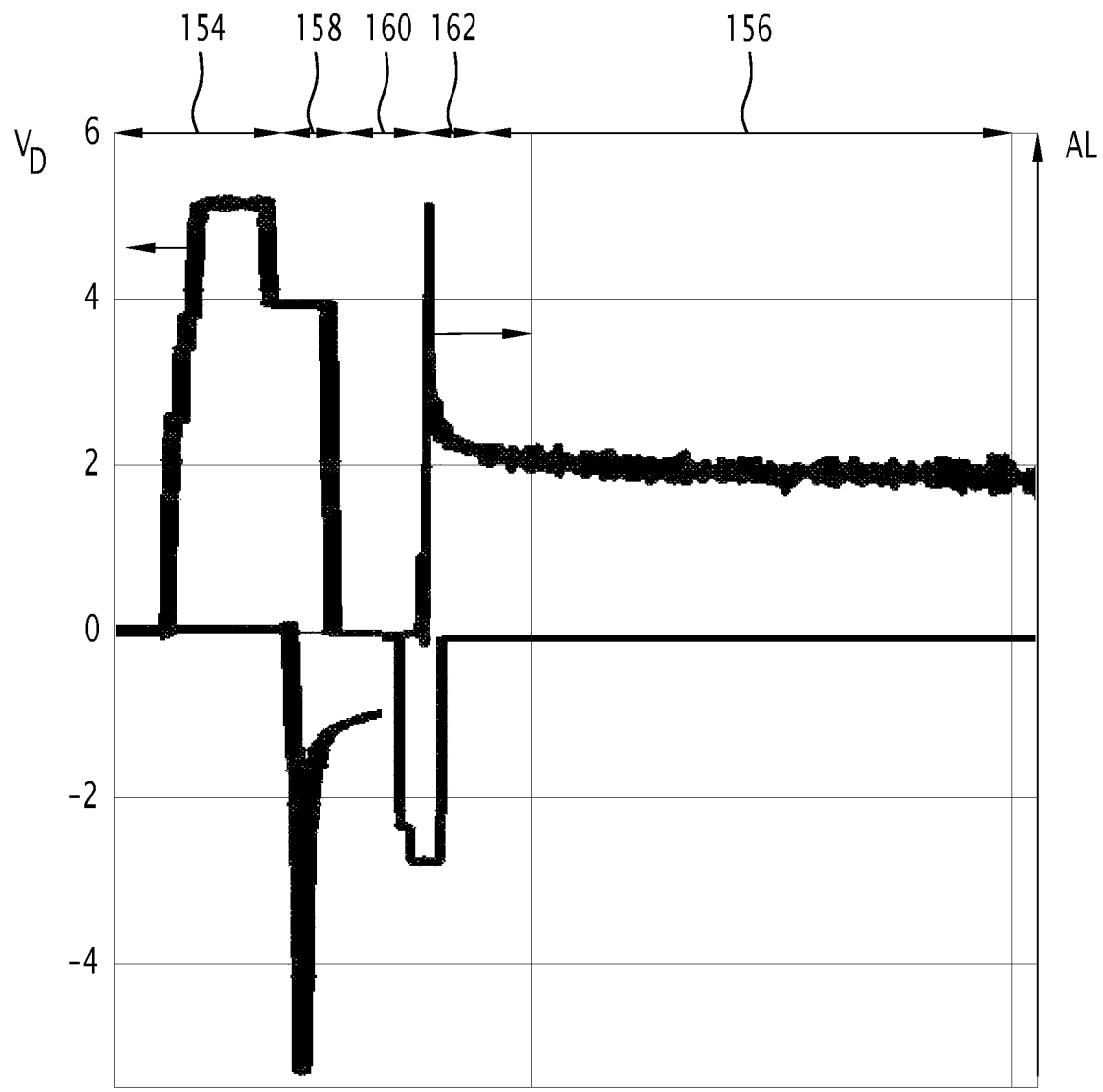
FIG. 5 is a view of the speed of movement VD of the line and the axial load AL applied to the line as a function of time by a series of runners of the endless belt, at the inlet or outlet of the gripping member, during the implementation of a method according to the invention.

As illustrated in FIG. 5, the axial load applied by a series of runners to the bottom of each gripping member 72A, 72B, and in particular to the bottom gripping member 72B at the time the line 12 is stopped (end of step 158) in the change of direction position is significant. This axial load is directed downwards.

If the line 12 were to be stopped in this position, this could lead to the line 12 not being gripped properly by the gripping members 72A, 72B, and possibly to the line 12 or one of the layers of the line 12 slipping if the capacity of the gripping members 72A, 72B is not sufficient.

As illustrated in FIG. 5, the limited raising 162 of the line to the stop position results in a complete reversal of the direction of the load on the gripping members 72A, 72B when they are finally stopped in the stop position.

In this way, the line 12 is stably fixed in the gripping members 72A, 72B, thus avoiding the undesired phenomena described above. As a result, the gripping members 72A, 72B do not have to be oversized and can be used for a higher laying capacity, increasing the mass of the line 12 that can be laid using the laying system 10 according to the invention.

This is achieved in a very simple way, by advantageous control of the laying of line 12.

Optionally, once the line is immobilised, a stabilisation method, as described in patent application FR 18 74403, is implemented to reduce the difference in load that may be observed between the upper gripping member 72A and the lower gripping member 72B.

In one embodiment (not shown), the line 12 is recovered using the system 10 according to the invention. Advantageously, in the recovery configuration, prior to the transition to the immobilisation configuration, the control module 136 is adapted to control the regulation module 132 to effect a limited upward overrun of the stop position to reach a change of direction position, followed by a delay in the change of direction position, prior to a limited lowering of the line 12 from the change of direction position to the stop position.

The limited overrun 158 is preferably at least 0.5 m. The limited overrun 158 is advantageously at most 10 m, for example at most 7 m, in particular at most 3 m, in particular at most 1 m. This overrun is generally between 0.5 m and 1 m.

In order to ensure an adequate change of direction of the line 12, the time delay 160 in the change of direction position, in which the line 12 remains stopped, preferably lasts at least 0.5 seconds.

The time delay 160 in the change of direction position advantageously lasts at most 60 seconds, preferably at most 40 seconds, in particular at most 10 seconds and is generally between 1 and 5 seconds.

In the method described in FIGS. 1 to 5, the upper gripping members 72A are located above the lower gripping members 72B. In the line 12 laying configuration, the gripping members 72A are therefore upstream gripping members 72A, and the gripping members 72B are downstream gripping members 72B with respect to the direction of movement of the line.

In an embodiment (not shown) with a horizontal laying system, the upstream gripping members 72A are not necessarily positioned above the downstream gripping members 72B.

The invention claimed is:

1. A line laying and/or recovering method in a body of water, comprising:
   providing a laying device comprising at least two upstream grippers facing each other and at least two downstream grippers facing each other, the grippers defining a line circulation passage in which the line is locally gripped; each gripper comprising a line mover and at least one motor for setting the line mover in motion the at least one motor being configured to be activated to deliver a line movement torque; the laying device comprising a controller for each motor, the method comprising:
   lowering the line to at least one stop position;
   stopping the line in the at least one stop position;
   the method comprising, prior to the at least one stopping of the line in the stop position:
   carrying out a limited downward overrun past the stop position to a change of direction position;
   time delaying in the change of direction position;
   limited raising of the line from the change of direction position to the stop position;
   successively stopping the line at a plurality of successive stop positions; and
   prior to each successive stop:
   carrying out a limited downward overrun of at least 0.5 m, passing each successive stop position to a successive change of direction position;
   time delaying in each successive change of direction position;
   limited raising of the line from each successive change of direction position to another successive stop position.

2. The method according to claim 1, wherein the limited overrun past the stop position is at most 10 m.

3. The method according to claim 1, wherein the time delaying in the change of direction position is at most 60 s.

4. The method according to claim 1, wherein the time delaying in the change of direction position is at least 0.5 s.

5. The method according to claim 1, wherein the limited downward overrun past the stop position to a change of direction position, the delaying in the change of direction position, and the limited upward raising of the line from the change of direction position to the stop position are implemented when a hanging weight of the line is greater than 50% of a maximum holding capacity of the grippers.

6. The method according to claim 1, comprising after the line has stopped in the at least one stop position:
   activating the motor of at least one of the upstream grippers and/or at least one of the downstream grippers by the controller, in order to apply to the mover(s) of the at least one of the upstream grippers and/or of at least one of the downstream grippers, a torque for retaining the line against a weight of the line by the pair of upstream grippers and/or by the pair of downstream grippers,
   at least occasionally controlling, by the controller, the at least one motor of at least one of the upstream grippers and/or of at least one of the downstream grippers in order to produce a movement of a mover of the at least one of the upstream grippers and/or of the at least one of the downstream grippers or to change the retaining torque applied to the mover of the at least one of the upstream grippers and/or of the at least one of the downstream grippers without moving the mover of the at least one of the upstream grippers and/or of the at least one of the downstream grippers.

7. The method according to claim 1, wherein after the line has been stopped in the at least one stop position, the method comprises installing a buoy around the line, carrying out a spot repair on the line, carrying out an underwater operation in relation to the line, or/and carrying out an underwater remotely operated vehicle intervention
   and/or postponing the laying, due to the weather and/or to constraints imposed by a neighbouring facility.

8. The method according to claim 1, comprising:
   raising the line to at least one further stop position;
   stopping the line in the at least one further stop position;
   the method comprising, prior to the at least one stopping of the line in the further stop position:
   carrying out a limited upward overrun past the further stop position to a further change of direction position;
   time delaying in the further change of direction position;
   limited lowering of the line from the further change of direction position to the further stop position.

* * * * *